2,906,777
Patented Sept. 29, 1959

2,906,777

N-ACYLATED HYDROXYBENZYLAMINO PHENOLS

Rolf Denss and Franz Häfliger, Basel, Switzerland, assignors to Geigy Chemical Corporation, New York, N.Y., a corporation of Delaware No Drawing. Application July 2, 1956
Serial No. 595,138

Claims priority, application Switzerland July 8, 1955

5 Claims. (Cl. 260—558)

The present invention is concerned with new N-acylated hydroxybenzylamino phenols which have valuable therapeutical properties, as well as with processes for the production thereof.

N-acyl hydroxybenzylamino phenols of the general formula:

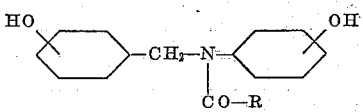     I wherein —CO—R represents the radical of an aliphatic, isocyclic or isocyclic-aliphatic carboxylic acid which may be substituted, have not been known up to now. Surprisingly it has now been found that these compounds have valuable therapeutical properties, in particular antiphlogistic activity. The new compounds defined above can be produced by reacting one mol of a carboxylic acid or a reactive functional derivative of a carboxylic acid corresponding to the general formula:

     II wherein R—CO has the meaning given above, Z represents a radical which can be split off, such as for example, the hydroxyl group, a halogen atom, an acyloxy radical, in particular the radical R—CO—O— or the acetoxy radical, the cyano group, the azido group or an alkoxy or cyanomethoxy group, or reacting one mol of a ketene with 1 mol of a hydroxybenzylamino phenol of the general formula:

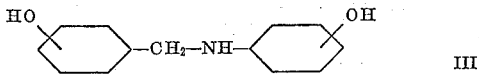     III the reaction being performed if necessary in the presence of an acid binding or a condensing agent.

Acid halides are most generally used as functional derivatives of carboxylic acids corresponding to the general Formula II; also acid anhydrides, in particular acetanhydride and mixed anhydrides of acetic acid with other carboxylic acids, as well as ketenes such as ketene, dimethyl ketene and diketene can be used. Also acid azides can be used as well as acyl cyanides, i.e. nitriles of α-keto acids such as e.g. benzoyl cyanide, which enable the amino group to be acylated under particularly mild conditions, and finally also esters, in particular reactive cyanomethyl esters can be used.

Examples of compounds of the general Formula II are the halides of acetic acid, propionic acid, butyric acid, valeric acid, isovaleric acid, capric acid, enanthic acid, pelargonic acid, capric acid, lauric acid and homologous higher fatty acids, isobutyric acid, methylethyl acetic acid, diethyl acetic acid, di-n-butyl acetic acid, di-isobutyl acetic acid, pivalic acid, crotonic acid, dimethyl acrylic acid, undecylenic acid, oleic acid, sorbic acid, ethoxy acetic acid, n-butoxy acetic acid, acetyl lactic acid, methyl mercapto acetic acid, cyclopropane carboxylic acid, cyclohexane carboxylic acid, α-cyclohexenyl propionic acid, α-cycloheptenyl butyric acid, benzoic acid, 2- and 4-chlorobenzoic acid, 4-bromobenzoic acid, o-, m- and p-toluic acid, 3.4-dimethyl benzoic acid, salicyclic acid, acetyl salicyclic acid, p-hydroxybenzoic acid, anisic acid, 4-isopropoxy benzoic acid, 4-methyl mercapto benzoic acid, veratric acid, piperonylic acid, 3.4.5-trimethoxy benzoic acid, vanillic acid, isovanillic acid, gallic acid, p-aminobenzoic acid, p-amino salicylic acid, α-naphthoic acid, β-naphthoic acid, phenyl acetic acid, β-phenyl propionic acid, cinnamic acid, 4-chlorocinnamic acid, piperic acid, acetyl mandelic acid, phenoxy acetic acid, o-cresoxy acetic acid, p-cresoxy acetic acid, phenyl mercapto acetic acid, γ-phenyl mercapto butyric acid, β-naphthyl acetic acid, β-naphthoxy acetic acid as well as acetanhydride and benzoic acid anhydride.

Hydroxybenzylamino phenols of the general Formula III can be produced for example by reduction of the corresponding hydroxybenzylamino phenols. Suitable starting materials are, e.g. 2- or 4-(2'-hydroxy-benzylamino)-phenol and 4-(4'-hydroxy-benzylamino)-phenol.

It is of advantage to perform the acylations by means of carboxylic acid halides in inert organic solvents such as, e.g. hydrocarbons of the benzene series or halogenated hydrocarbons, in which process for example a second mol of the hydroxybenzylamino phenol to be acylated or of a tertiary organic base such as, e.g. pyridine, dimethyl aniline or a trialkylamine, can serve as acid binding agent. Such a base can also serve as solvent at the same time. Acylations with carboxylic acid anhydrides are generally performed in an analogous manner; acetanhydride and mixed anhydrides containing the acetic acid radical can be reacted with the hydroxybenzylamino phenols for example also in glacial acetic acid in the presence of a condensing agent, such as e.g. sodium acetate. By the reaction of one mol of carboxylic acid derivative with one mol of hydroxybenzylamino phenol, reactions are also understood in which an excess of carboxylic acid derivative is used provided that the reaction conditions or the properties of the carboxylic acid derivative prevent an acylation of the hydroxyl groups.

In addition, the new acylated hydroxybenzylamino phenols of general Formula I can also be produced by partially hydrolysing O-mono- or O-di-acyl derivatives or mono- or di-(α-alkoxyalkyl)-ethers of compounds of the general Formula I, i.e. while keeping the acid amide linkage but splitting all the ester or acetal linkages. The new compounds may also be obtained by hydrogenolysing mono- or di-aralkylethers of compounds of Formula I until all aralkylether linkages are split. The calculated amounts of aqueous or, in particular, alcoholic alkali lyes as well as mineral acids can be used as hydrolysing agents. Also hydrolysis of any ester linkages in the carboxylic acid radical R—CO can be performed simultaneously with the hydrolysis of ester linkages in the phenyl and/or benzyl radical. Such ester linkages can be, for example in the radicals of acyloxy acid radicals like the acetyl salicylic acid radicals, as the use of acyloxy carboxylic acid halides for the N-acylation of hydroxybenzylamino phenols and subsequent hydrolysis, e.g. while working up, is generally the most advantageous or the only possible method for the production of compounds of the general Formula I in which R—CO represents the radical of a hydroxy carboxylic acid.

The hydrogenolysis may be performed by reacting the mono- or di-aralkylethers with hydrogen in the presence of nickel or noble metal catalysts until the calculated amount of hydrogen is taken up.

The O-mono- and O-di- acyl derivatives of compounds of the general Formula I are easily obtained for example analogously to the compounds with free hydroxyl groups, by N acylation of O-mono- or O-di- acyl derivatives of hydroxybenzylamino phenols of the general Formula III, in which acylation more energetic reaction conditions or an excess of acylating agent can be used because of the protection of the hydroxyl group when acylating at the N-atom. Finally, complete acylation, i.e. acylation at the nitrogen and the oxygen atoms, of corresponding hydroxybenzylamino phenols by means of easily accessible acylating agents or of derivatives of carboxylic acids which can easily be regained, can be used. In an analogous manner, also the mono- and di- (α-alkoxy-alkyl)-ethers of compounds of the general Formula I can be produced by acylating the corresponding (α-alkoxy-alkyl)-ethers, i.e. acetal derivatives of compounds of the general Formula III. In this specification radicals in which the α-alkoxy and the alkyl group are bound to each other to form a ring such as the tetrahydropyran-yl-(α) radical are also understood as α-alkoxy-alkyl groups.

Due to the presence of two phenolic hydroxyl groups, most of the compounds which can be produced according to the present invention are soluble in aqueous alkalies and they form salts with inorganic and organic bases.

The following examples serve to illustrate the production of the new compounds, the more suitable term N-hydroxybenzyl-N-hydroxyphenyl acid amides being used. Parts are given as parts by weight and their relationship to parts by volume is as that of grammes to cubic centimetres. The temperatures are given in degrees centigrade.

Example 1

10 parts of N-(p-hydroxy-benzyl)-p-amino phenol (produced by reduction of the condensation product of p-amino phenol and p-hydroxy benzaldehyde, M.P. 155–156°) are added at 15–25° to a mixture of 4.59 parts of acetic acid anhydride, 3.85 parts of sodium acetate and 6.14 parts of glacial acetic acid. After stirring for 2 hours at room temperature, the reaction mixture is taken up in water and ether, the ethereal solution is washed with diluted hydrochloric acid and extracted with diluted caustic soda lye. By acidifying the caustic soda lye extract, N-(p-hydroxy-benzyl)-N-(p-hydroxy-phenyl)-acetamide is obtained which can be recrystallised from 80% alcohol. M.P. 139–140°.

Example 2

14.1 parts of benzoyl chloride in 20 parts by volume of chloroform are added dropwise while stirring to 43 parts of N-(p'-hydroxy-benzyl)-p-amino phenol in 200 parts by volume of chloroform, during which addition the temperature rises considerably. The whole is then stirred for some time at room temperature. The precipitate is then filtered off under suction, washed with chloroform and then slurried several times with 1 N-sulphuric acid. The residue, which has been washed neutral with water, is dissolved in 1 N-caustic soda lye, filtered with animal charcoal and the N-(p'-hydroxy-benzyl)-N-(p-hydroxy-phenyl)-benzamide is precipitated with excess hydrochloric acid. M.P. 189.5–190.5° recrystallised from a mixture of alcohol and water.

Example 3

19.1 parts of dibutyl acetic acid chloride in 20 parts by volume of chloroform are added dropwise while stirring to a mixture of 21.6 parts of N-(p'-hydroxy-benzyl)-p-amino phenol, 16.2 parts by volume of pyridine and 100 parts by volume of chloroform. The reaction mixture is boiled under reflux for 4 hours. After cooling, it is filtered under suction, the chloroform solution is washed with 2 N-hydrochloric acid and water, dried with sodium sulphate and evaporated. The residue can be purified by dissolving in alcoholic/aqueous caustic soda lye and precipitating with hydrochloric acid. Recrystallised from 80% alcohol, the N-(p'-hydroxy-benzyl)-N-(p-hydroxy-phenyl)-dibutylacetamide melts at 177.5–178.5°.

The following compounds can be produced in an analogous manner:

| | M.P. |
|---|---|
| N-(p'-hydroxy-benzyl)-N-(p-hydroxy-phenyl)- | |
| -4-chlor-benzamide | 198–199° |
| -2-hydroxy-benzamide | 183–185° |
| -phenoxy-acetamide | 176–177° |
| -cinnamic acid amide | 227–229° |
| -β-phenyl-propionamide | 147–148° |
| -γ-phenylmercapto butyramide | 124–125° |
| -caproic acid amide | 147–148° |
| -α-cycloheptenyl butyramide | 177–178° |
| -α-ethyl thiopropionamide | 144–145° |
| -4-isopropoxy-benzamide | 204–206° |
| -isobutyramide | 214–215° |
| -2-acetyloxy-benzamide | 150–155° |
| -2-methyl-benzamide | 222–224° |
| -4-benzyloxy-benzamide | 193–195° |
| -stearylamide | 120–122° |
| -3.4.5-trimethoxy-benzamide | 231–233° |
| -4-hydroxy-benzamide+1 mol benzene | 85–90° |
| -4-tertiary butyl-benzamide | 196–198° |
| -4-n-butoxy-benzamide | 87–88° |
| -acetyloxy-acetamide | 70–71° |
| -3.4-dimethyl-benzamide | 198–200° |
| N-(p'-hydroxy-benzyl)-N-(o-hydroxy-phenyl)- | |
| -benzamide | 181–183° |
| -dibutylacetamide | 177–178° |
| -phenylacetamide | 181–183° |
| -acetamide | 165–166° |
| -butyramide | 134–136° |
| N-(o'-hydroxy-benzyl)-N-(p-hydroxy-phenyl)- | |
| -benzamide | 180.5–182.5° |
| -acetamide | 142–144° |
| -dibutyl-acetamide | 181–182.5° |
| -isobutyramide | 172–174° |
| -acetyloxy-acetamide | 155–157° |

The compounds according to the present invention have an antiphlogistic action in man. For example, N-(p'-hydroxybenzyl)-N-(p-hydroxyphenyl) - cinnamic acid amide or N-(p'-hydroxybenzyl)-N-(p-hydroxyphenyl)-4-chlorobenzamide may be used for the treatment of rheumatic diseases and other inflammatory disorders.

They are administered, e.g. perorally in the form of tablets or coated tablets in a dose of 0.2 g. three to five times per day.

What we claim is:

1. An N-acylated hydroxybenzylamino phenol corresponding to the formula:

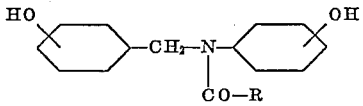

wherein R represents a member selected from the group consisting of alkyl, phenyl, hydroxyphenyl, acetoxy(lower)alkyl, lower alkoxyphenyl, chlorophenyl, benzyloxyphenyl, phenoxy(lower)alkyl, phenylmercapto(lower)alkyl and (lower)alkylmercapto(lower)alkyl radicals.

2. N-(p'-hydroxybenzyl)-N-(p-hydroxyphenyl) - cinnamic acid amide.

3. N - (p' - hydroxybenzyl)-N-(p-hydroxyphenyl)-4-chlorobenzamide.

4. N-(o'-hydroxybenzyl)-N-(p-hydroxyphenyl) - benzamide.

5. N-(p'-hydroxybenzyl)-N-(p-hydroxyphenyl) - benzamide.

References Cited in the file of this patent

Edward: Journal of the Chemical Society (1954), Part II, pages 1464–7 (London).

Bakunin et al.: Gazzetta Chimica Italiana, vol. 37, Part II (1907), p. 248 relied on.